United States Patent [19]

Amstutz

[11] Patent Number: 4,464,837
[45] Date of Patent: Aug. 14, 1984

[54] GRIPPER DEVICE FOR HEDGE AND SHRUBBERY TRIMMER SHEARS

[76] Inventor: Willis J. Amstutz, 307 E. Monroe St., Pandora, Ohio 45877

[21] Appl. No.: 427,502

[22] Filed: Sep. 29, 1982

[51] Int. Cl.³ .............................................. B26B 13/22
[52] U.S. Cl. ..................................................... 30/134
[58] Field of Search ........................... 30/134, 135, 136; 56/327 A, 335, 336

[56] References Cited

U.S. PATENT DOCUMENTS

| | | | |
|---|---|---|---|
| 1,151,874 | 8/1915 | Harris | 30/134 |
| 1,650,948 | 11/1927 | Long | 30/135 |
| 2,086,081 | 7/1937 | Hollenbeck | 30/134 |
| 2,553,697 | 5/1951 | Zacrep | 30/135 |

Primary Examiner—Jimmy C. Peters
Attorney, Agent, or Firm—Daniel J. Tick

[57] ABSTRACT

A gripper device is affixed to the first and second blades of hedge and shrubbery trimmer gripper shears in a manner whereby the gripper device does not interfere with normal interaction of the blades in cutting shrubs, hedges, vegetation, or other material and retains severed material on the blades until the severed material is manually removed.

4 Claims, 1 Drawing Figure

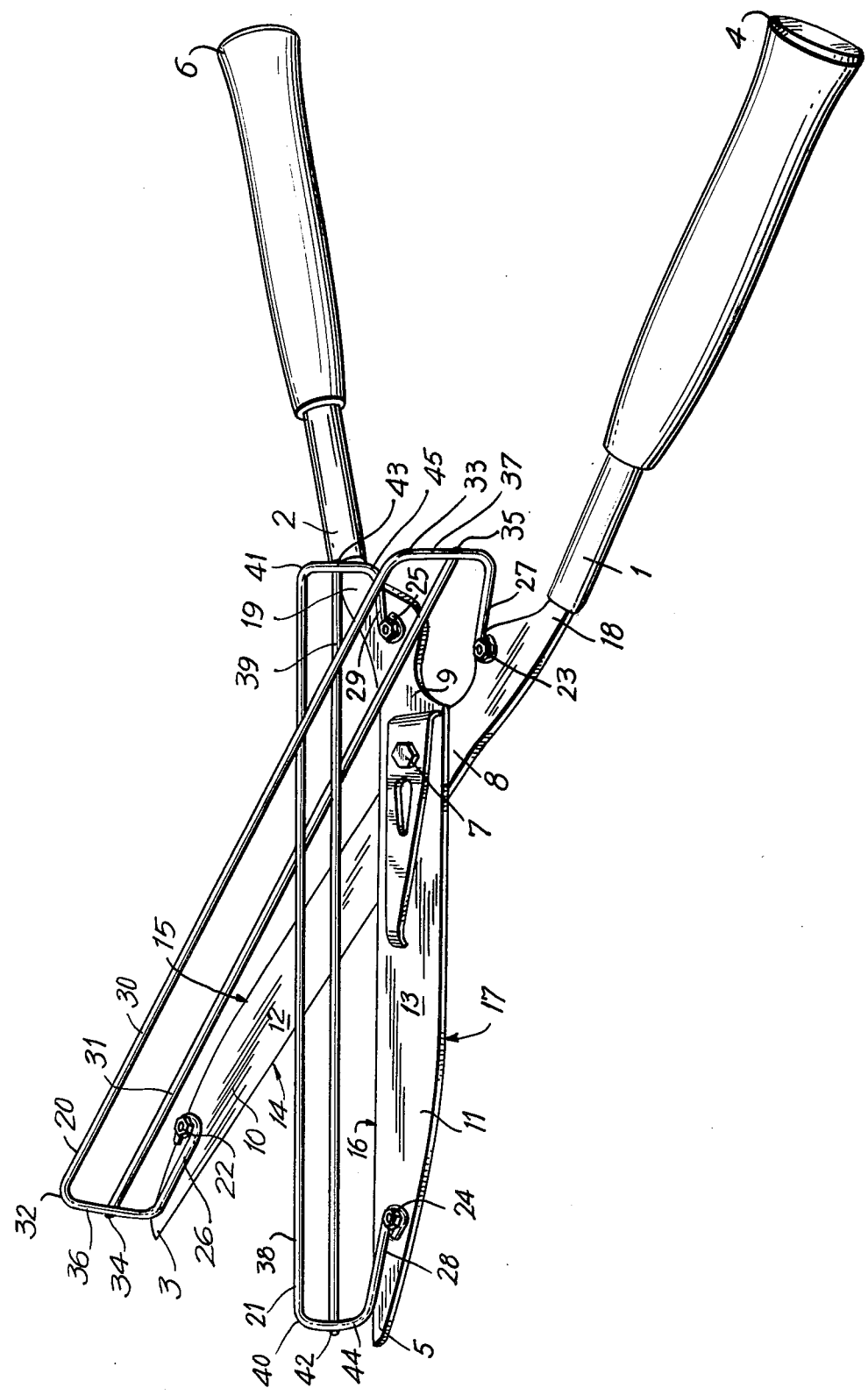

GRIPPER DEVICE FOR HEDGE AND SHRUBBERY TRIMMER SHEARS

BACKGROUND OF THE INVENTION

The present invention relates to hedge and shrubbery trimmer shears. More particularly, the invention relates to hedge and shrubbery trimmer gripper shears which first cut material and then retain the severed material until such severed material is manually removed.

When hedges, shrubs, or the like, are trimmed by trimmer shears of known type, the stems, vegetation or other material cut by the shears usually falls to the ground and sometimes falls onto hedges, shrubs, or the like, beneath those being trimmed. Thus, when the trimming has been completed, it is necessary to pick up and suitably dispose of the severed material.

The principal object of the invention is to provide hedge and shrubbery trimmer gripper shears which retain severed material until it is manually removed.

An object of the invention is to provide hedge and shrubbery trimmer gripper shears of simple structure which function efficiently, effectively and reliably to retain severed material until it is manually removed thereby eliminating the work required for collecting fallen, severed material.

Another object of the invention is to provide hedge and shrubbery trimmer gripper shears which are readily constructed from standard trimmer shears and on which a gripper device is readily mounted and removed.

Still another object of the invention is to provide hedge and shrubbery trimmer gripper shears which are used with facility and ease by anyone, regardless of his or her mechanical propensities.

BRIEF SUMMARY OF THE INVENTION

In accordance with the invention, hedge and shrubbery trimmer gripper shears having first and second handle members each having spaced opposite first and second ends, the handle members being pivotally affixed to each other in pivot areas intermediate the first and second ends thereof, a first blade extending at the first end of the first handle member and a second blade extending at the first end of the second handle member, the first and second blades having substantially planar facing surfaces facing each other, spaced opposite backing surfaces on the opposite sides of the blades from the facing surfaces and facing away from each other, a cutting edge and a spaced opposite back edge opposite the cutting edge, comprise a gripper device affixed to the first and second blades in a manner whereby the gripper device permits normal interaction of the blades in cutting material and retains severed material on the blades until the severed material is manually removed.

The gripper device is removably affixed to the blades.

The gripper device is affixed to the facing surface of the first blade and to the backing surface of the second blade.

Each of the first and second blades has a first end coincident with the first end of the first and second handle members, respectively, and a spaced opposite second end intermediate the pivot areas and the second end of the first and second handle members, respectively, and wherein the gripper means comprises a first substantially rigid wire member affixed to the facing surface of the first blade and extending in spaced substantially parallel relation to the length of the first blade and a second substantially rigid wire member affixed to the backing surface of the second blade and extending in spaced substantially parallel relation to the length of the second blade.

The gripper device is affixed to the blades in closer proximity to the back edges of the blades than to the cutting edges of the blades.

The first and second wire members are removably affixed to the blades.

The first wire member has a first end affixed to the facing surface of the first blade in proximity with the first end of the first blade and a spaced opposite second end affixed to the facing surface of the first blade in proximity with the second end of the first blade and the second wire member has a first end affixed to the backing surface of the second blade in proximity with the first end of the second blade and a spaced opposite second end affixed to the backing surface of the second blade in proximity with the second end of the second blade.

Each of the first and second wire members is of substantially inverted U-shaped configuration having a first pair of spaced substantially parallel wires extending in spaced substantially parallel relation to the lengths of the first and second blades, respectively, each of the first pair of wires having spaced opposite first and second ends, and a second pair of spaced connecting wires substantially perpendicular to the first pair of wires and joined to the first pair of wires at their first and second ends, respectively, and to the affixed first and second blades, respectively.

The second pair of connecting wires of one of the first and second wire members is slightly longer than the second pair of connecting wires of the other of the first and second wire members, so that the first pair of wires of each of the first and second wire members is free from obstruction by the first pair of wires of the other of the first and second wire members.

BRIEF DESCRIPTION OF THE DRAWINGS

In order that the invention may be readily carried into effect, it will now be described with reference to the accompanying drawings, wherein the single FIGURE is a perspective view of an embodiment of the hedge and shrubbery trimmer gripper shears.

DETAILED DESCRIPTION OF PREFERRED EMBODIMENT OF THE INVENTION

Hedge and shrubbery trimmer shears, as shown in the FIGURE, have first and second handle members 1 and 2, respectively. The first handle member 1 has spaced opposite first and second ends 3 and 4, respectively, and the second handle member 2 has spaced opposite first and second ends 5 and 6, respectively. The first and second handle members 1 and 2 are pivotally affixed to each other, via a pivot pin, bolt, or the like 7, in pivot areas 8 and 9 intermediate the first and second ends of said handle members.

A first blade 10 extends at the first end 3 of the first handle member 1 and a second blade 11 extends at the first end 5 of the second handle member 2. The first and second blades 10 and 11 have substantially planar facing surfaces facing each other, of which only the facing surface 12 of said first blade is seen in the FIGURE, and spaced opposite backing surfaces on the opposite side of said blades from said facing surfaces and facing away from each other. Only the backing surface 13 of the second blade 11 is seen in the FIGURE.

The first blade 10 has a cutting edge 14 and a spaced opposite back edge 15 opposite said cutting edge. The second blade 11 has a cutting edge 16 and a spaced opposite back edge 17 opposite said cutting edge. The first blade 10 has a first end coincident with the first end 3 of the first handle member 1 and a spaced opposite second end 18 intermediate the pivot area 8 and the second end 4 of said first handle member. The second blade 11 has a first end coincident with the first end 5 of the second handle member 2 and a spaced opposite second end 19 intermediate the pivot area 9 and the second end 6 of said second handle member.

In accordance with the invention, a gripper device is affixed to the first and second blades 10 and 11, thereby converting the trimmer shears to hedge and shrubbery trimmer gripper shears. The gripper device is affixed to the blades 10 and 11 in a manner whereby said gripper device permits normal interaction of said blades in cutting material and retains severed material on said blades until the severed material is manually removed. The gripper device is removably affixed to the blades 10 and 11 to permit maintenance such as, for example, sharpening of the blades, of the trimmer gripper shears and replacement of said gripper device in part or wholly.

The gripper device is affixed to the facing surface 12 of the first blade 10 and to the backing surface 13 of the second blade 11, and is affixed to said blades in closer proximity to the back edges 15 and 17 of said blades than to the cutting edges 14 and 16 thereof.

The gripper device of the invention comprises a first substantially rigid wire member 20 affixed to the facing surface 12 of the first blade 10 and extending in spaced substantially parallel relation to the length of said first blade and a second substantially rigid wire member 21 affixed to the backing surface 13 of the second blade 11 and extending in spaced substantially parallel relation to the length of said second blade. The wire members 20 and 21 consist of any suitable material such as, for example, stainless steel, uncoated or coated with a plastic film, and are removable affixed to the blades 10 and 11, respectively, by any suitable coupling means such as, for example, bolts or screws 22 and 23 and bolts or screws 24 and 25, respectively.

Each of the first and second wire members 20 and 21 is of substantially inverted U-shaped configuration, as shown in the FIGURE and the first wire member 20 has a first end 26 affixed to the facing surface 12 of the first blade 10 in proximity with the first end 3 of said first blade, and a spaced opposite second end 27 affixed to said facing surface in proximity with the second end 18 of said first blade. The second wire member 21 has a first end 28 affixed to the backing surface 13 of the second blade 11 in proximity with the first end 5 of said second blade, and a spaced opposite second end 29 affixed to said backing surface in proximity with the second end 19 of said second blade.

The first wire member 20 has a first pair of spaced substantially parallel wires 30 and 31 extending in spaced substantially parallel relation to the length of the first blade 10. Each of the wires 30 and 31 has spaced opposite first and second ends 32 and 33, and 34 and 35, respectively. The first wire member 20 also has a second pair of spaced connecting wires 36 and 37 substantially perpendicular to the first pair of wires 30 and 31 and joined to said first pair of wires at their first and second ends 32 and 33, and 34 and 35, respectively, and affixed to the first blade 10.

The second wire member 21 has a first pair of spaced substantially parallel wires 38 and 39 extending in spaced substantially parallel relation to the length of the second blade 11. Each of the wires 38 and 39 has spaced opposite first and second ends 40 and 41, and 42 and 43, respectively. The second wire member 21 also has a second pair of spaced connecting wires 44 and 45 substantially perpendicular to the first pair of wires 38 and 39 and joined to said first pair of wires at their first and second ends 40 and 41, and 42 and 43, respectively, and affixed to the second blade 11.

The second pair of connecting wires 36 and 37 of the first wire member 20 is slightly longer than the second pair of connecting wires 44 and 45 of the second wire member 21, so that the first pair of wires 30 and 31 of said first wire member and the first pair of wires 38 and 39 of said second wire member are free from obstruction by each other. The trimmer and gripper shears of the invention thus function as desired, with proper cutting action due to interaction of the blades 10 and 11, without interference by the gripper device, and proper retention of material due to operation of the wire members 20 and 21, without interference with each other.

While the invention has been described by means of a specific example and in a specific embodiment, I do not wish to be limited thereto, for obvious modifications will occur to those skilled in the art without departing from the spirit and scope of the invention.

I claim:

1. A gripper device for hedge and shrubbery trimmer shears having first and second handle members each having spaced opposite first and second ends, said handle members being pivotally affixed to each other in pivot areas intermediate the first and second ends thereof, a first blade extending at the first end of the first handle member and a second blade extending at the first end of the second handle member, said first and second blades having substantially planar facing surfaces facing each other, spaced opposite backing surfaces on the opposite sides of said blades from said facing surfaces and facing away from each other, a cutting edge and a spaced opposite back edge opposite said cutting edge, each of said first and second blades having a first end coincident with the first end of said first and second handle members, respectively, and a spaced opposite second end intermediate said pivot areas and the second end of said first and second handle members, respectively, said gripper device comprising a first substantially rigid wire member removably affixed to the facing surface of said first blade and extending in spaced substantially parallel relation to the length of said first blade, said first wire member having a first end affixed to the facing surface of said first blade in proximity with the first end of said first blade and a spaced opposite second end affixed to said facing surface of said first blade in proximity with the second end of said first blade; and a second substantially rigid wire member removable affixed to the backing surface of said second blade and extending in spaced substantially parallel relation to the length of said second blade, said wire member having a first end affixed to the backing surface of said second blade in proximity with the first end of said second blade and a spaced opposite second end affixed to said backing surface of said second blade in proximity with the second end of said second blade, said wire members permitting normal interaction of said blades in cutting material and retaining severed material on said blades until said severed material is manually removed.

2. A gripper device as claimed in claim 1, wherein said wire members are affixed to said blades in closer proximity to said back edges of said blades than to said cutting edges of said blades.

3. A gripper device as claimed in claim 1, wherein each of said first and second wire members is of substantially inverted U-shaped configuration having a first pair of spaced substantially parallel wires extending in spaced substantially parallel relation to the lengths of said first and second blades, respectively, each of said first pair of wires having spaced opposite first and second ends, and a second pair of spaced connecting wires substantially perpendicular to said first pair of wires and joined to said first pair of wires at their first and second ends, respectively, and to said affixed first and second blades, respectively.

4. A gripper device as claimed in claim 1, wherein the second pair of connecting wires of one of said first and second wire members is slightly longer than the second pair of connecting wires of the other of said first and second wire members so that the first pair of wires of each of said first and second wire members is free from obstruction by the first pair of wires of the other of said first and second wire members.

* * * * *